US009357156B2

(12) United States Patent
Sakaguchi

(10) Patent No.: US 9,357,156 B2
(45) Date of Patent: May 31, 2016

(54) PROJECTION DISPLAY DEVICE

(71) Applicant: PANASONIC INTELLECTUAL PROPERTY MANAGEMENT CO., LTD., Osaka-shi, Osaka (JP)

(72) Inventor: Hirokazu Sakaguchi, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 155 days.

(21) Appl. No.: 14/207,668

(22) Filed: Mar. 13, 2014

(65) Prior Publication Data

US 2014/0285779 A1    Sep. 25, 2014

(30) Foreign Application Priority Data

Mar. 19, 2013  (JP) ................................. 2013-056319
Dec. 19, 2013  (JP) ................................. 2013-262194

(51) Int. Cl.
*H04N 5/74* (2006.01)
*G03B 21/20* (2006.01)
*H04N 9/31* (2006.01)

(52) U.S. Cl.
CPC ............ *H04N 5/7458* (2013.01); *G03B 21/206* (2013.01); *G03B 21/2053* (2013.01); *H04N 9/3114* (2013.01); *H04N 9/3155* (2013.01); *H04N 9/3179* (2013.01)

(58) Field of Classification Search
CPC .. G03B 21/28; G03B 21/206; G03B 21/2053; H04N 9/3152; H04N 9/3155; H04N 9/3197

USPC .......................... 353/38, 88, 99; 348/743–747
See application file for complete search history.

(56) References Cited

U.S. PATENT DOCUMENTS

| 2005/0147364 | A1* | 7/2005 | Ikeda ................. G02B 26/0841 385/115 |
| 2006/0114362 | A1 | 6/2006 | Kim et al. |
| 2006/0268232 | A1* | 11/2006 | Jin .......................... G03B 21/14 352/204 |
| 2007/0064203 | A1* | 3/2007 | Sawai ...................... G03B 9/04 353/97 |
| 2008/0192464 | A1 | 8/2008 | Cheng et al. |
| 2009/0168041 | A1 | 7/2009 | Sawai |
| 2009/0244499 | A1* | 10/2009 | Bartlett .................... G02B 6/00 353/99 |
| 2010/0177253 | A1* | 7/2010 | Golub ................ G02B 27/0927 349/8 |

FOREIGN PATENT DOCUMENTS

| CN | 1779503 A | 5/2006 |
| JP | 2004-258439 A | 9/2004 |
| JP | 2007206549 A | 8/2007 |
| TW | 200833104 A | 8/2008 |

OTHER PUBLICATIONS

Office Action for corresponding Chinese Patent Application No. 201410089936.6, issued Apr. 6, 2016.

* cited by examiner

*Primary Examiner* — Sultan Chowdhury
(74) *Attorney, Agent, or Firm* — Shinjyu Global IP

(57) ABSTRACT

A projector 100 comprising a light source (130), a reflective light bulb (DMD 180), a projection optical system, an illumination optical system (120) that guides light emitted from the light source to the reflective light bulb, a stationary aperture (166), and a movable aperture (167).

10 Claims, 4 Drawing Sheets

PROJECTION DISPLAY DEVICE

CROSS-REFERENCE TO RELATED APPLICATIONS

This application claims priority to Japanese Patent Application No. 2013-056319 filed on Mar. 19, 2013 and Japanese Patent Application No. 2013-262194 filed on Dec. 19, 2013. The entire disclosures of Japanese Patent Application No. 2013-056319 and Japanese Patent Application No. 2013-262194 are hereby incorporated herein by reference.

BACKGROUND

Description of the Related Art

Patent Literature 1 (Japanese Laid-Open Patent Application 2004-258439) discloses a projection display device. This projection display device comprises a light source, a light blocking plate, a DMD (digital micromirror device), and a light blocking plate drive means.

The light blocking plate drive means controls the light blocking plate. Consequently, with the projection display device in Patent Literature 1, any unnecessary light produced by light being reflected at the DMD surface can be blocked, so that an image can be displayed with the contrast adjusted.

SUMMARY

This disclosure provides a projection display device with which any unnecessary light produced by light being reflected at the DMD surface can be blocked, so that the contrast of the projection display device can be controlled according to the video.

The projection display device disclosed herein comprises a light source, a reflective light bulb, a projection optical system, an illumination optical system, a stationary aperture, and a movable aperture. The reflective light bulb modulates light emitted from the light source. The projection optical system outputs an image produced by the reflective light bulb along a specific optical path and projects the image on a specific projection face. The illumination optical system guides light emitted from the light source to the reflective light bulb. The stationary aperture is provided in the interior of the illumination optical system and blocks a part of the light emitted from the light source. The movable aperture that is provided in the interior of the illumination optical system and blocks a part of the light emitted from the light source. The reflective light bulb has a surface part. The surface part receives a part of the light emitted from the light source and reflects it as planar reflected light. The stationary aperture is provided at a position where it blocks the planar reflected light from being incident on the projection optical system.

With the projection display device disclosed herein, any unnecessary light produced by light being reflected at the DMD surface can be blocked, while the contrast of the projection display device can be controlled according to the video, which raises the quality of the projected image.

DETAILED DESCRIPTION OF THE INVENTION

Embodiments will now be described in detail through reference to the drawings as needed. Unnecessarily detailed description may be omitted in some cases, however. For instance, detailed description of well known facts, or redundant description of components that are substantially the same may be omitted. The purpose of this is to keep the following description from being needlessly repetitive, to facilitate an understanding by a person skilled in the art.

The applicant has provided the appended drawings and the following description so that a person skilled in the art might fully understand what is disclosed herein, and does not intend for the subject of the claims to be limited thereby.

Embodiment 1

The projector 100 pertaining to Embodiment 1 will now be described through reference to FIGS. 1 to 6.

1-1 Overview

Figure 1:
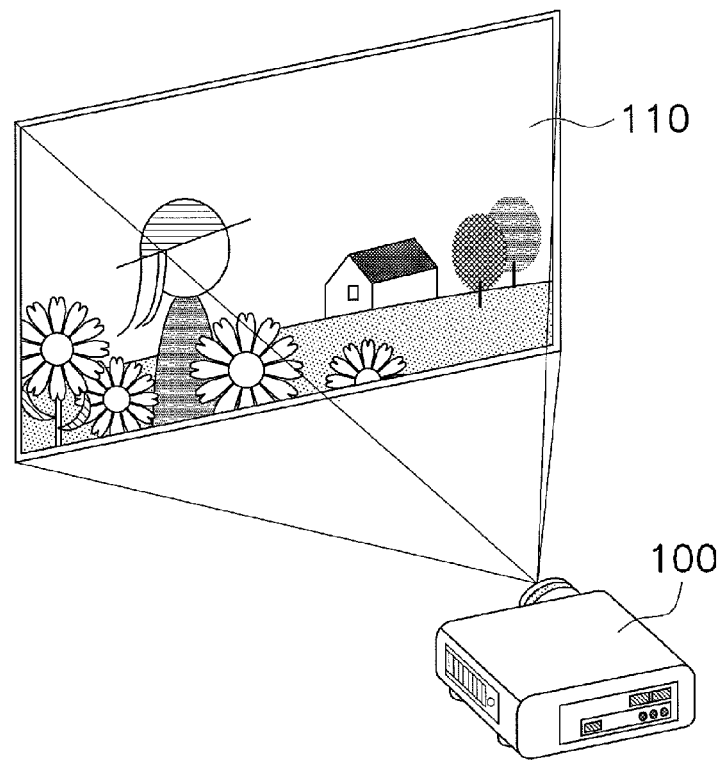
FIG. 1 is an oblique view of an exterior of the projector pertaining to Embodiment 1.

An overview of the projector 100 in this embodiment will be described through reference to the FIG. 1. FIG. 1 is an oblique view of the projector 100.

The projector 100 comprises an illumination optical system, a digital micromirror device (hereinafter referred to as DMD), a prism, and a projection component. The projector 100 produces video by reflecting the light emitted from a light source device at the DMD. The projector 100 projects the resulting video onto a screen 110 via the projection component.

1-2 Configuration 1-2-1. Overall Configuration

Figure 2:
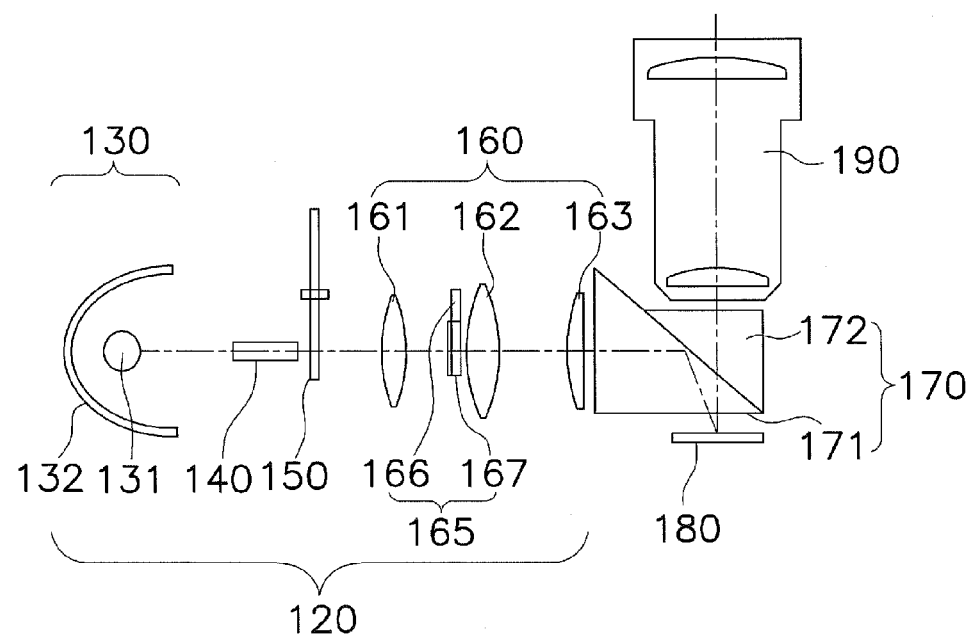
FIG. 2 is a simplified diagram of the configuration of the projector pertaining to Embodiment 1.

The overall configuration of the projector 100 will be described through reference to FIG. 2. FIG. 2 is a simplified diagram of the configuration of the projector 100 pertaining to this embodiment.

First, the light emitted from a light source 130 of the projector 100 is transmitted by a color wheel 150, which produces a plurality of colors of illumination light in time-sharing. After this, the illumination light is incident on a TIR prism 170. The light incident on the TIR prism 170 is then incident on a DMD (reflective light bulb) 180, and video is produced. The video thus produced is projected via a projection component (projection optical system) 190 onto the screen 110 (see FIG. 1).

The configuration of the projector 100 will now be described in detail.

An illumination optical system 120 has the light source 130, a rod integrator 140, the color wheel 150, and a relay optical system 160.

The light source 130 has a luminous tube 131 and a reflector 132.

The luminous tube 131 emits a light flux that includes red, green, and blue light having mutually different wavelength bands. The luminous tube 131 is made up of a high-pressure mercury vapor lamp or a metal halide lamp, for example.

The reflector 132 reflects the light flux emitted from the luminous tube 131, and aligns it in the emission direction.

The rod integrator 140 makes the luminance of the incident light uniform. The light incident on the rod integrator 140 repeatedly undergoes total reflection inside the rod integrator 140, and is emitted at a uniform luminance distribution at the emission face of the rod integrator 140. The rod integrator 140 is provided at a position where the light emitted from the light source 130 is incident.

The color wheel 150 is in the shape of a disk, and has color filters for each of the red (R) segment, the green (G) segment, the blue (B) segment, and the white (W) segment, which are divided up at specific angles (not shown).

The red color filter transmits red light, which is light having a wavelength of about 580 to 700 nm, out of the light emitted from the light source 130. The green color filter transmits green light, which is light having a wavelength of about 480 to 580 nm, out of the light emitted from the light source 130. The blue color filter transmits blue light, which is light having a wavelength of about 400 to 480 nm, out of the light emitted from the light source 130. The white color filter transmits all of the light emitted from the light source 130.

The color wheel 150 is disposed near the rod integrator 140, or more precisely, close to the end on the downstream side of the rod integrator 140, on the optical path of the light emitted from the light source 130. The color wheel 150 rotates at a specific speed under drive force from a drive mechanism (not shown). The color wheel 150 separates the light emitted from the light source 130 into a plurality of colors of light in time-sharing. The color wheel 150 has a first region having one or more segments, and a second region having a segment other than that of the first region. The first region is the RGB segment. The second region is the W segment.

The relay optical system 160 guides light transmitted by the color wheel 150 to the DMD 180. The relay optical system 160 is made up of a plurality of lenses 161, 162, and 163 that can keep the light emitted from the light source rod integrator 140 at a consistent luminance distribution.

An aperture component 165 is provided on the optical path of the light emitted from the light source luminous tube 131, and at a position just before where the light is incident on the lens 162. The configuration of the aperture component 165 will be described below through reference to FIG. 3.

The TIR prism 170 guides light emitted from the relay optical system 160 to the DMD 180. The TIR prism 170 is made up of a prism 171 and a prism 172. There is an air layer (not shown) near the prism 171 and the prism 172. The air layer is a thin layer of air. A light flux incident at an angle of at least a critical angle is totally reflected by the air layer. The totally reflected light flux is incident on the DMD 180.

The DMD 180 has 1920×1200 micromirrors. The DMD 180 deflects each of the micromirrors according to a video signal. Consequently, the DMD 180 separates the light into light that is incident on the projection component 190, and light that is reflected outside of the effective range of the projection component 190. A part of the light flux reflected at the DMD 180 is transmitted by the TIR prism 170 and is incident on the projection component 190. The light flux that is incident on the TIR prism 170 is incident on the air layer at or below the critical angle. Therefore, this light flux is transmitted by the air layer and is incident on the projection component 190.

The projection component 190 is an optical system for expanding the incident light flux, and is made up of a lens having a focusing function or an expansion function. The projection component 190 projects the image light formed by the DMD 180 onto the screen 110 (see FIG. 1).

1-2-2. Aperture Mechanism Configuration

Figure 3:
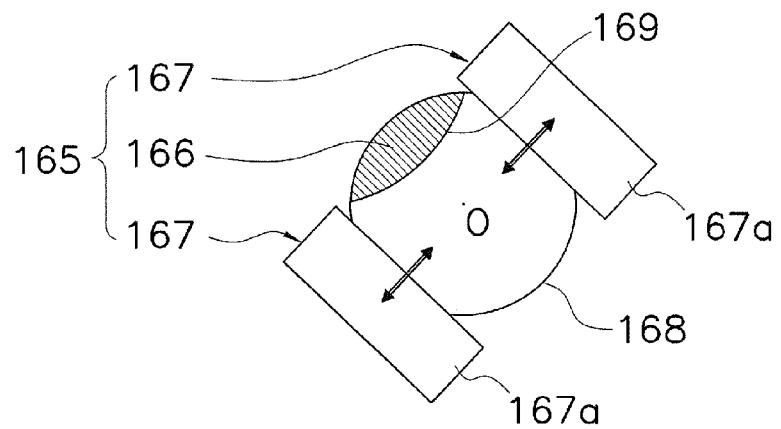
FIG. 3 is a diagram of the aperture mechanism of the projector pertaining to Embodiment 1.

FIG. 3 is a diagram of the aperture mechanism of the projector 100 pertaining to this embodiment. FIG. 3 shows the configuration of the aperture component 165 on a plane perpendicular to the optical axis of the light emitted from the light source 130.

The aperture component 165 has a stationary aperture 166 and movable apertures 167.

The stationary aperture 166 is provided in the interior of the illumination optical system 120, and blocks a part of the light emitted from the light source 130. The stationary aperture 166 is a blocker that blocks an illumination light flux 168. The insertion direction of the stationary aperture 166 is a direction in which the incidence angle of illumination light on the DMD 180 is stopped down to fit within a specific angle range. In other words, of the illumination light 300 incident on the DMD 180, the stationary aperture 166 blocks the portion on the side with the smaller incidence angle with respect to the DMD 180 (see FIG. 6B). The stationary aperture 166 is installed at a position that is substantially conjugate with the entrance pupil of the projection component 190. If the stationary aperture 166 were not disposed at a position that is substantially conjugate with the entrance pupil, there would be a risk of a shadow occurring on a part of the image projected on the screen 110.

The above-mentioned conjugate position refers to a position that is in an optically conjugate relationship. More specifically, a relationship of two points in which light emitted from one of the points is focused on the other point. This is the relation between an object and an image, for example.

The stationary aperture 166 is provided at a position that is substantially at a right angle to the movable apertures 167, centered on the optical axis, in a plane that is perpendicular to the optical axis. The stationary aperture 166 has an arc portion 169.

The arc portion 169 is provided so that a part of the light emitted from the light source light source 130 will be blocked in a plane that is perpendicular to the optical axis. The light emitted from the light source 130 is such that the cross section of the illumination light flux 168 is circular in a plane that is perpendicular to the optical axis. Also, as discussed above, a part of the cross section of the light flux is blocked by the stationary aperture 166 in a plane that is perpendicular to the optical axis. Consequently, as shown in FIG. 3, the arc portion 169 is such that the illumination light flux 168 has a crescent-shaped cross section.

The movable apertures 167 are provided in the interior of the illumination optical system 120, and block a part of the light emitted from the light source 130. The two movable apertures 167 each have a blocking component 167a. The blocking components 167a are flat in shape and have a rectangular cross section in a plane that is perpendicular to the optical axis. The blocking components 167a are provided so that the distance between them can be equally adjusted around the optical axis, in a plane that is perpendicular to the optical axis. That is, the blocking components 167a block the illumination light flux 168 symmetrically from both sides.

As shown in FIG. 3, the movable apertures 167 are disposed at positions near the stationary aperture 166. As shown in FIG. 3, the insertion direction with respect to the center O of the light flux 168 of the movable apertures 167 is a direction that is perpendicular to the insertion direction with respect to the center O of the light flux 168 of the stationary aperture 166 (the arrow direction in FIG. 3). In other words, the movable apertures 167 and the stationary aperture 166 are provided at positions that are substantially at a right angle, using the center (optical axis) of the light flux 168 as the center, in a plane that is perpendicular to the optical axis of the light flux 168. The movable apertures 167 can control the brightness of the video by controlling how much of the illumination light flux 168 is blocked.

1-3 Video Output Operation 1-3-1. Configuration of Video Output System

Figure 4:
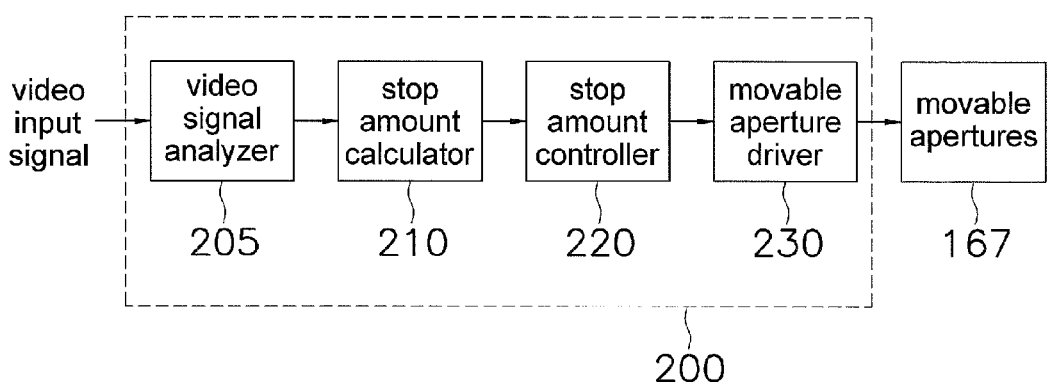
FIG. 4 is a control block diagram of the projector pertaining to Embodiment 1.

FIG. 4 is a control block diagram of the projector 100 pertaining to this embodiment. The projected image output system of the projector 100 will now be described through reference to FIG. 4.

The projector 100 comprises a controller 200. The controller 200 has a video signal analyzer 205, a stop amount calculator 210, a stop amount controller 220, and a movable aperture driver 230. The controller 200 receives inputted video signals, and controls the movable apertures 167 on the basis of these video signals. A video signal inputted to the controller 200 may be one already provided to an internal memory (not shown) of the projector 100, or may be a video signal that is transmitted through an external network or the like.

The video signal analyzer 205 analyzes the video signal for each group of image data, in frame units. The video signal analyzer 205 selects the brightness for each frame from the inputted video signal, and outputs video analysis information.

The stop amount calculator 210 calculates the stop amount of the movable apertures 167 on the basis of the video analysis information selected by the video signal analyzer 205. For example, with a video signal that has low luminance, the amount of illumination light is suppressed and the contrast of the image is raised by increasing the stop amount. Conversely, with a video signal that has high luminance, the amount of stop is reduced and the amount of illumination light is maintained, to raise the brightness of the projected image.

The stop amount calculator 210 outputs the calculated stop amount of the movable apertures 167 and outputs it as a control signal to the stop amount controller 220.

The stop amount controller 220 supplies drive energy to the movable aperture driver 230 according to the inputted control signal.

The movable aperture driver 230 is a motor or the like, and can be driven with voltage, current, or the like. The movable apertures 167 are moved under the drive of the movable aperture driver 230.

1-4 Effect

The effect of the projector 100 configured as above will now be described through reference to FIGS. 5A to 6B.

Figure 5A:
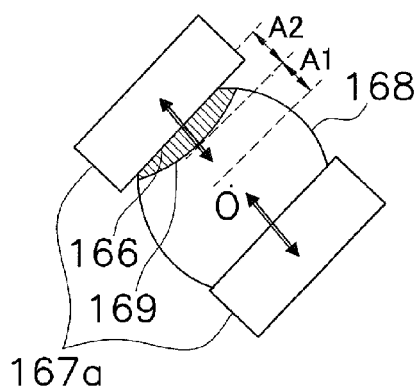
FIG. 5A is a comparative diagram illustrating the effect produced by a conventional projector.
Figure 5A:
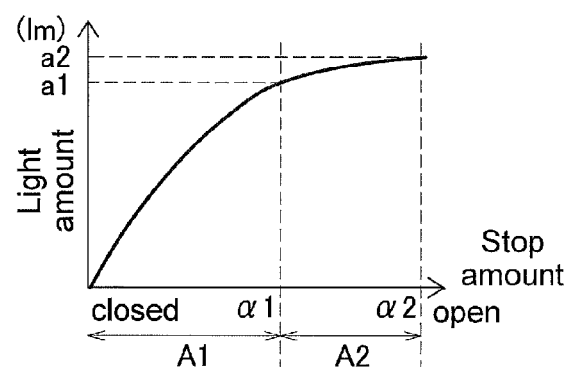
Figure 5B:
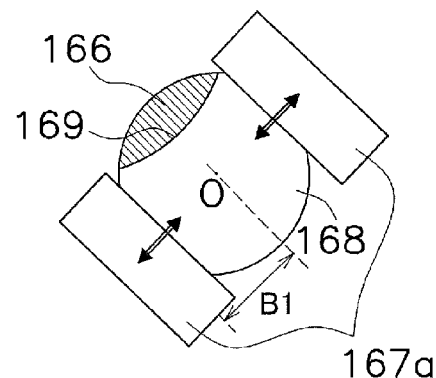
FIG. 5B illustrates the effect of the projector pertaining to Embodiment 1.
Figure 5B:
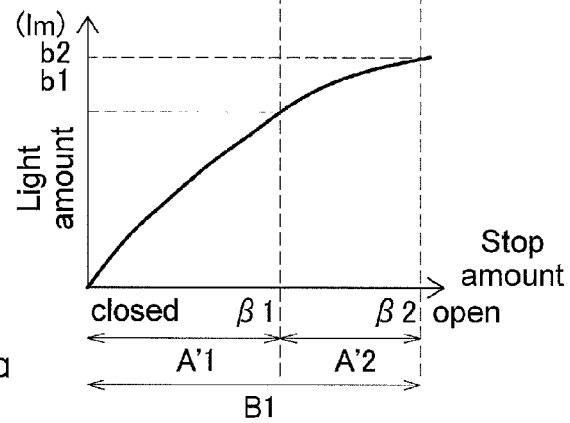

FIG. 5A is a comparative diagram of a conventional configuration, for illustrating the effect of the projector 100 pertaining to this embodiment. FIG. 5B illustrates the effect of the projector 100 pertaining to this embodiment. FIG. 6 illustrates the effect of the projector 100 pertaining to this embodiment.

FIG. 5A shows the case when the insertion direction with respect to the center O of the light flux 168 of the stationary aperture 166 coincides with the insertion direction with respect to the center O of the light flux 168 of the movable apertures 167, in a plane that is perpendicular to the optical axis. FIG. 5B shows the case when the insertion direction with respect to the center O of the light flux 168 of the stationary aperture 166 is perpendicular to the insertion direction of the movable apertures 167, in a plane that is perpendicular to the optical axis of the light flux 168.

As shown in the left diagram of FIG. 5A, the stationary aperture 166 blocks a range of A2 in a direction facing the center O of the light flux 168 from the end of the illumination light flux 168, in a plane that is perpendicular to the optical axis of the light flux 168. The stationary aperture 166 has the arc portion 169, and is disposed so that the length between the end of the light flux and the center of the arc of the arc portion 169 is A2. A2 is the proper length for removing the unnecessary light component 305 in FIG. 6 (discussed below).

The right side of FIG. 5A is a graph of the relation between the stop amount and the light amount. The vertical axis is the amount of light that is incident on the DMD 180, and the horizontal axis is the stop amount produced by the movable apertures 167. a1 is the amount of light when the movable apertures 167 are opened by the distance A1 from their closed state (stop amount α1), and a2 is the amount of light when the movable apertures 167 are opened by the distance A2 from their state of having been opened by the distance A1 (stop amount α2).

As shown in the left diagram in FIG. 5B, the stationary aperture 166 blocks a range of B1 in a direction facing the center O of the light flux 168 from the end of the illumination light flux 168, in a plane that is perpendicular to the optical axis.

The right side of FIG. 5B is a graph of the relation between the stop amount and the light amount. The vertical axis is the amount of light that is incident on the DMD 180, and the horizontal axis is the stop amount produced by the movable apertures 167. A'1 and A'2 in FIG. 5B are distances corresponding to A1 and A2 in FIG. 5A. b1 is the amount of light when the movable apertures 167 are opened by the distance A'1 from their closed state (stop amount β1). b2 is the amount of light when the movable apertures 167 are opened by the distance A'2 from their state of having been opened by the distance A'1 (stop amount P2).

If, as shown on the left side in FIG. 5A, the insertion direction of the stationary aperture 166 with respect to the center O of the light flux 168 coincides with the insertion direction of the movable apertures 167 in a plane that is perpendicular to the optical axis of the light flux 168, there will be a decrease in how well the amount of light conforms to the stop amount during the A2 period, as shown on the right side in FIG. 5A. This is because the blocking regions of the stationary aperture 166 and the movable apertures 167 overlap in the A2 period, so the effect of controlling the amount of light by the movable apertures 167 is substantially lost.

Meanwhile, if, as shown in FIG. 5B, the insertion direction of the stationary aperture 166 with respect to the center O of the light flux 168 is perpendicular to the insertion direction of the movable apertures 167 in a plane that is perpendicular to the optical axis of the light flux 168, there will be an increase in how well the amount of light conforms to the stop amount. This is because there is little area over which the stationary aperture 166 and the movable apertures 167 overlap.

With the projector 100 in this embodiment, as discussed above, because the insertion direction of the stationary aperture 166 with respect to the center O of the light flux 168 is perpendicular to the insertion direction of the movable apertures 167, the amount of change in the light amount can be made to conform to the amount of change in the stop amount better than with the conventional configuration shown in FIG. 5A.

The mode of reflected light with respect to the light incident on the DMD 180 will now be described through reference to FIGS. 6A and 6B.

Figure 6A:
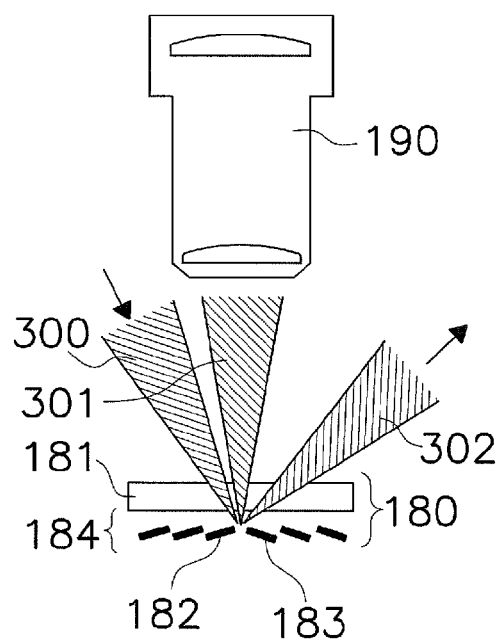
FIGS. 6A and 6B illustrate the effect of the projector pertaining to Embodiment 1.
Figure 6B:
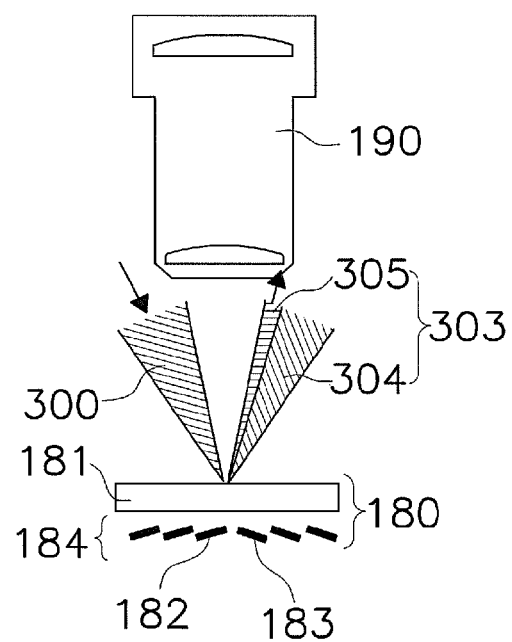

FIGS. 6A and 6B illustrate the effect of the projector 100 pertaining to this embodiment. FIG. 6A shows the case when the incident light is reflected by a micromirror 184 of the DMD 180. FIG. 6B shows the case when the incident light is reflected by a cover glass 181 of the DMD 180.

As shown in FIG. 6A, the DMD (reflective light bulb) 180 is provided directly downstream from the projection component 190 along the optical path. The DMD 180 has the cover glass 181 and the micromirror 184.

The cover glass 181 is a surface component. The cover glass 181 is made of transparent glass and keeps dust away from the DMD 180.

The micromirror 184 has a plurality of tiny mirrors, and can be switched between an on state 182 and an off state 183. The inclination of the tiny mirrors is changed between the two states.

The illumination light 300 is directed obliquely at the surface of the DMD 180. If the micromirror 184 of the DMD 180 is in its on state 182, the light reflected by the DMD 180 is reflected as ON light 301.

The ON light 301 goes through an opening in the projection component 190 and is projected onto the screen 110 (see FIG. 1). If the micromirror 184 is in its off state 183, the light reflected by the DMD 180 is reflected as OFF light 302. The OFF light 302 does not go through the opening in the projection component 190, and is not projected onto the screen 110 (see FIG. 1).

As shown in FIG. 6B, when the incident light is reflected at the cover glass 181 of the DMD 180, the illumination light 300 directed obliquely at the surface of the DMD 180 is reflected by the surface of the cover glass 181, and is reflected as planar reflected light 303.

The planar reflected light 303 has OFF light 304 and the unnecessary light component 305. The OFF light 304 does not go through the opening in the projection component 190 and is not projected onto the screen 110. The unnecessary light component 305 goes through the opening in the projection component 190 and is projected onto the screen 110. Therefore, the unnecessary light component 305, which is a part of the planar reflected light 303, is a source of decreased contrast in the video.

In view of this, with the projector 100 in this embodiment, as described above, the stationary aperture 166 shown in FIGS. 3 and 5B is provided at a position where it blocks the unnecessary light component 305 that is included in the planar reflected light 303 of the illumination light 300 shown in FIG. 6B, and that is incident on the projection optical system. Specifically, the stationary aperture 166 prevents the unnecessary light component 305, out of the planar reflected light 303 reflected at the surface of the cover glass 181 from the illumination light 300, from being incident on the projection optical system.

Consequently, this prevents the unnecessary light component 305 from going through the projection component 190 and lowering the contrast of the video. Therefore, better quality is obtained in the projected video.

Other Embodiments

This disclosure is not limited to the above embodiment, and various modifications and changes are possible without departing from the gist of this disclosure.

(A)

In the above embodiment, the movable apertures 167 were flat and shaped such that their cross section viewed in the incidence direction of light was rectangular, but this disclosure is not limited to this.

For example, movable apertures of some other shape may be used, such as one that is flat and shaped such that the cross section viewed in the incidence direction of light is triangular, trapezoidal, etc. As long as light can be blocked in stages by moving the movable apertures 167, the same effect can be obtained.

(B)

In the above embodiment, the two movable apertures 167 were installed, but this disclosure is not limited to this.

For example, there may be three or more movable apertures. As long as light can be blocked in stages by moving the movable apertures 167, the same effect can be obtained.

(C)

An embodiment considered as the base mode and other embodiments were given above through reference to the appended drawings and by a detailed description. These embodiments were provided in order to exemplify to a person skilled in the art what is discussed in the patent claims, by referring to specific embodiments. Therefore, various modifications, substitutions, additions, omissions, and so forth can be made to the above embodiments within the scope of the patent claims or equivalents thereof.

GENERAL INTERPRETATION OF TERMS

In understanding the scope of the present invention, the term "configured" as used herein to describe a component, section, or a part of a device includes hardware and/or software that is constructed and/or programmed to carry out the desired function.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms "including," "having," and their derivatives. Also, the terms "part," "section," "portion," "member," or "element" when used in the singular can have the dual meaning of a single part or a plurality of parts.

Terms that are expressed as "means-plus function" in the claims should include any structure that can be utilized to carry out the function of that part of the present invention. Finally, terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A projection display device, comprising: a light source; a reflective light bulb including a reflective surface, the reflective light bulb configured to modulate fight emitted from the light source, and to produce an image; a projection optical system configured to output the image along a specific optical path, and to project the image onto a specific projection face; an illumination optical system configured to guide light emitted from the light source to the reflective light bulb; a stationary aperture provided inside of the illumination optical system, the stationary aperture configured to block a first portion of the light emitted from the light source; a movable aperture provided inside of the illumination optical system, the movable aperture configured to block a second portion of the light emitted from the light source; an optical axis being a center axis of the light emitted from the light source; a plane perpendicular to the optical axis; wherein the reflective surface receives a portion of the light emitted from the light source and reflects it as planar reflected light; the stationary aperture is disposed such that it blocks the planar reflected light from entering the projection optical system; the stationary aperture includes an arc portion disposed on the plane; and the arc portion blocks a portion of the planar reflected light of the light emitted from the light source; a first portion of the planar reflected light having a first incidence angle; a second portion of the planar reflected light having a second incidence angle; the first incidence angle being smaller than the second incidence angle; and wherein the arc portion blocks the first portion of the planar reflected light.

2. The projection display device according to claim 1, further comprising:
an optical axis being an axis of the light emitted from the light source; and
a plane perpendicular to the optical axis;
wherein the movable aperture and the stationary aperture are provided centered on the optical axis, and substantially on the plane.

3. The projection display device according to claim 1, further comprising:
an optical axis being a center axis of the light emitted from the light source; and
a plurality of movable apertures, each movable aperture including a blocker,
the blockers disposed on a plane perpendicular to the optical axis, and configured to be adjusted to move towards the optical axis and away from the optical axis;
wherein the plurality of movable apertures are disposed such that the blockers are equidistant from the optical axis.

4. The projection display device according to claim 3, further comprising:
a controller configured to control the movement of the blockers according to an inputted video signal.

5. The projection display device according to claim 2, wherein:
the stationary aperture includes an arc portion disposed on the plane, and
the arc portion blocks a portion of the light emitted from the light source.

6. The projection display device according to claim 2, further comprising:
a plurality of movable apertures, each movable aperture including a blocker,
the blockers disposed on a plane perpendicular to the optical axis, and configured to be adjusted to move towards the optical axis and away from the optical axis;
wherein the plurality of movable apertures are disposed such that the blockers are equidistant from the optical axis.

7. The projection display device according to claim 2, further comprising:
a controller configured to control the amount of movement of the plurality of blockers of the movable aperture according to an inputted video signal.

8. The projection display device according to claim 1, further comprising:
a plurality of movable apertures, each movable aperture including a blocker,
the blockers disposed on a plane perpendicular to the optical axis, and configured to be adjusted to move towards the optical axis and away from the optical axis;
wherein the plurality of movable apertures are disposed such that the blockers are equidistant from the optical axis.

9. The projection display device according to claim 1, further comprising:
a controller configured to control the movement of the blockers according to an inputted video signal.

10. The projection display device according to claim 3, further comprising:
a controller configured to control the movement of the blockers according to an inputted video signal.

* * * * *